United States Patent
Jordan, Jr.

(10) Patent No.: US 7,376,413 B2
(45) Date of Patent: *May 20, 2008

(54) VOICE MAILBOX WITH MANAGEMENT SUPPORT

(75) Inventor: Royce D. Jordan, Jr., Lawrenceville, GA (US)

(73) Assignee: AT&T Delaware Intellectual Property, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/028,973

(22) Filed: Jan. 4, 2005

(65) Prior Publication Data

US 2005/0111631 A1    May 26, 2005

Related U.S. Application Data (62) Division of application No. 10/097,278, filed on Mar. 14, 2002, now abandoned.

(60) Provisional application No. 60/343,305, filed on Dec. 18, 2001.

(51) Int. Cl.
| | |
|---|---|
| H04M 1/663 | (2006.01) |
| H04M 1/725 | (2006.01) |
| H04M 11/10 | (2006.01) |
| H04M 11/00 | (2006.01) |
| H04B 1/38 | (2006.01) |

(52) U.S. Cl. .................. 455/412.2; 455/413; 455/566; 379/88.12; 379/88.14

(58) Field of Classification Search ............. 455/412.2, 455/413, 456.3, 566; 379/88.12, 88.13
See application file for complete search history.

(56) References Cited

U.S. PATENT DOCUMENTS

| | | | |
|---|---|---|---|
| 4,930,152 A | | 5/1990 | Miller |
| 4,933,967 A | | 6/1990 | Lo et al. |
| 4,951,044 A | * | 8/1990 | Nelson et al. ............. 340/7.22 |
| 5,058,152 A | | 10/1991 | Solomon et al. |
| 5,313,515 A | * | 5/1994 | Allen et al. ................. 455/413 |
| 5,353,331 A | | 10/1994 | Emery et al. |
| 5,361,295 A | | 11/1994 | Solomon et al. |
| 5,425,091 A | | 6/1995 | Josephs |
| 5,493,607 A | | 2/1996 | Arumainayagam et al. |

(Continued)

FOREIGN PATENT DOCUMENTS

EP            0255325           2/1988

(Continued)

OTHER PUBLICATIONS

M. Day, et al.; Instant Messaging / Presence Protocol Requirements; Feb. 2000; pp. 1-25.

(Continued)

*Primary Examiner*—Fan Tsang
*Assistant Examiner*—Lisa Hashem
(74) *Attorney, Agent, or Firm*—Thomas, Kayden, Horstemeyer & Risley (57) ABSTRACT

Systems and techniques for providing telecommunications services by receiving a notification forwarded from a wireless device, the notification indicating that a voicemail message intended for a recipient associated with the wireless device was received. The voicemail message associated with the notifications is retrieved and forwarded to an alternate device associated with the recipient and/or converted into a text message representative of the content of the voicemail message.

18 Claims, 5 Drawing Sheets

U.S. PATENT DOCUMENTS

| | | | |
|---|---|---|---|
| 5,521,969 A | 5/1996 | Paulus et al. | |
| 5,559,800 A | 9/1996 | Mousseau et al. | 370/85.13 |
| 5,572,578 A | 11/1996 | Lin et al. | |
| 5,572,583 A | 11/1996 | Wheeler, Jr. et al. | |
| 5,631,948 A | 5/1997 | Bartholomew et al. | |
| 5,680,442 A | 10/1997 | Bartholomew et al. | |
| 5,684,862 A | 11/1997 | Finnigan | |
| 5,687,220 A | 11/1997 | Finnigan | |
| 5,692,033 A | 11/1997 | Farris | |
| 5,712,903 A | 1/1998 | Bartholomew et al. | |
| 5,717,742 A | 2/1998 | Hyde-Thomson | |
| 5,740,230 A | 4/1998 | Vaudreuil | |
| 5,740,231 A | 4/1998 | Cohn et al. | |
| 5,742,668 A * | 4/1998 | Pepe et al. | 455/415 |
| 5,742,763 A | 4/1998 | Jones | |
| 5,742,769 A | 4/1998 | Lee et al. | |
| 5,742,905 A | 4/1998 | Pepe et al. | |
| 5,764,747 A | 6/1998 | Yue et al. | |
| 5,768,348 A | 6/1998 | Solomon et al. | |
| 5,790,637 A | 8/1998 | Johnson et al. | |
| 5,802,466 A * | 9/1998 | Gallant et al. | 455/413 |
| 5,812,639 A | 9/1998 | Bartholomew et al. | |
| 5,812,670 A | 9/1998 | Micali | |
| 5,832,072 A | 11/1998 | Rozenblit | |
| 5,832,221 A | 11/1998 | Jones | |
| 5,838,768 A | 11/1998 | Sumar et al. | |
| 5,848,132 A | 12/1998 | Morley et al. | |
| 5,884,160 A * | 3/1999 | Kanazaki | 455/413 |
| 5,905,774 A | 5/1999 | Tatchell et al. | |
| 5,930,479 A | 7/1999 | Hall | |
| 5,940,478 A | 8/1999 | Vaudreuil et al. | |
| 5,940,740 A | 8/1999 | Aas et al. | 340/7.22 |
| 5,987,317 A * | 11/1999 | Venturini | 455/412.2 |
| 5,999,595 A | 12/1999 | Shaffer et al. | |
| 6,002,751 A | 12/1999 | Shaffer | |
| 6,005,845 A | 12/1999 | Svennesson et al. | |
| 6,005,922 A | 12/1999 | Longster et al. | |
| 6,006,087 A * | 12/1999 | Amin | 455/413 |
| 6,049,713 A * | 4/2000 | Tran et al. | 455/415 |
| 6,061,432 A | 5/2000 | Wallace et al. | |
| 6,064,723 A | 5/2000 | Cohn et al. | |
| 6,064,876 A * | 5/2000 | Ishida et al. | 455/412.1 |
| 6,069,890 A | 5/2000 | White et al. | |
| 6,122,348 A | 9/2000 | French-St. George et al. | |
| 6,148,069 A | 11/2000 | Ekstrom et al. | |
| 6,169,795 B1 | 1/2001 | Dunn et al. | |
| 6,181,780 B1 | 1/2001 | Finnigan | |
| 6,209,100 B1 | 3/2001 | Robertson et al. | |
| 6,219,694 B1 | 4/2001 | Lazaridis et al. | 709/206 |
| 6,226,359 B1 | 5/2001 | Montgomery et al. | |
| 6,233,318 B1 | 5/2001 | Picard et al. | |
| 6,233,430 B1 * | 5/2001 | Helferich | 340/7.21 |
| 6,243,374 B1 | 6/2001 | White et al. | |
| 6,259,892 B1 * | 7/2001 | Helferich | 455/412.1 |
| 6,292,799 B1 | 9/2001 | Peek et al. | |
| 6,301,349 B1 | 10/2001 | Malik | |
| 6,317,484 B1 | 11/2001 | McAllister | |
| 6,330,079 B1 | 12/2001 | Dugan et al. | |
| 6,333,973 B1 * | 12/2001 | Smith et al. | 379/88.12 |
| 6,339,640 B1 | 1/2002 | Chen et al. | |
| 6,366,651 B1 * | 4/2002 | Griffith et al. | 379/88.14 |
| 6,389,115 B1 * | 5/2002 | Swistock | 379/88.12 |
| 6,389,276 B1 * | 5/2002 | Brilla et al. | 455/413 |
| 6,393,908 B1 | 5/2002 | Swain et al. | |
| 6,408,176 B1 | 6/2002 | Urs | |
| 6,418,200 B1 | 7/2002 | Ciccolella et al. | |
| 6,507,643 B1 * | 1/2003 | Groner | 379/88.14 |
| 6,580,784 B2 * | 6/2003 | Rodriguez et al. | 379/88.12 |
| 6,654,601 B2 * | 11/2003 | Picoult et al. | 455/412.1 |
| 6,683,940 B2 * | 1/2004 | Contractor | 379/88.17 |
| 6,707,890 B1 | 3/2004 | Gao et al. | 379/88.12 |
| 6,751,298 B2 * | 6/2004 | Bhogal et al. | 379/88.13 |
| 6,782,081 B2 | 8/2004 | Malik | |
| 6,801,932 B1 * | 10/2004 | Picoult et al. | 709/206 |
| 6,829,474 B1 * | 12/2004 | Adachi | 455/414.1 |
| 6,865,384 B2 | 3/2005 | Sagi et al. | |
| 6,882,708 B1 | 4/2005 | Bedingfield et al. | |
| 6,940,958 B2 * | 9/2005 | Clapper | 379/142.01 |
| 6,981,223 B2 | 12/2005 | Becker et al. | |
| 6,990,180 B2 * | 1/2006 | Vuori | 379/88.25 |
| 6,999,565 B1 | 2/2006 | Delaney et al. | |
| 7,062,257 B2 * | 6/2006 | Amin | 455/413 |
| 7,130,388 B1 * | 10/2006 | Bell | 379/88.12 |
| 7,136,461 B1 * | 11/2006 | Swingle et al. | 379/88.13 |
| 7,142,646 B2 * | 11/2006 | Zafar et al. | 379/88.17 |
| 7,167,546 B2 | 1/2007 | Moore | |
| 7,167,701 B1 * | 1/2007 | Jordan, Jr. | 455/412.2 |
| 7,190,950 B1 * | 3/2007 | Baker et al. | 455/413 |
| 7,283,808 B2 * | 10/2007 | Castell et al. | 455/413 |
| 7,317,929 B1 * | 1/2008 | El-Fishawy et al. | 455/466 |
| 2001/0033639 A1 | 10/2001 | Martin | 379/88.14 |
| 2001/0044297 A1 * | 11/2001 | Myer et al. | 455/412 |
| 2002/0067806 A1 * | 6/2002 | Rodriguez et al. | 379/88.12 |
| 2002/0077082 A1 | 6/2002 | Cruickshank | 455/413 |
| 2002/0085534 A1 * | 7/2002 | Williams et al. | 370/352 |
| 2002/0087643 A1 | 7/2002 | Parsons et al. | 709/206 |
| 2002/0090963 A1 * | 7/2002 | Avalos et al. | 455/466 |
| 2002/0110226 A1 | 8/2002 | Kovales et al. | |
| 2002/0173306 A1 | 11/2002 | Adamany et al. | 455/432 |
| 2002/0173308 A1 | 11/2002 | Dorenbosch et al. | 455/435 |
| 2002/0181673 A1 | 12/2002 | Henry et al. | 379/88.22 |
| 2003/0002632 A1 * | 1/2003 | Bhogal et al. | 379/67.1 |
| 2003/0027560 A1 * | 2/2003 | Jammal | 455/417 |
| 2003/0095643 A1 | 5/2003 | Fortman et al. | |
| 2003/0147512 A1 | 8/2003 | Abburi | 379/88.22 |
| 2003/0194990 A1 * | 10/2003 | Helferich | 455/412.2 |
| 2003/0229670 A1 | 12/2003 | Beyda | |
| 2004/0076272 A1 | 4/2004 | Zafar et al. | 379/88.13 |
| 2004/0161089 A1 | 8/2004 | Hanson et al. | 379/88.17 |
| 2005/0020288 A1 | 1/2005 | Davis et al. | |
| 2005/0055441 A1 | 3/2005 | Bouchard et al. | 709/206 |
| 2005/0124325 A1 * | 6/2005 | Chaudry et al. | 455/413 |
| 2006/0234683 A1 * | 10/2006 | Amin | 455/413 |
| 2007/0147316 A1 * | 6/2007 | Khan et al. | 370/338 |
| 2007/0149176 A1 * | 6/2007 | Wells et al. | 455/412.2 |
| 2007/0274465 A1 * | 11/2007 | Othmer | 379/67.1 |

FOREIGN PATENT DOCUMENTS

| | | |
|---|---|---|
| EP | 0412799 | 2/1991 |
| EP | 0507125 | 10/1992 |
| EP | 0543235 | 5/1993 |
| EP | 0624967 | 11/1994 |
| EP | 0662762 | 7/1995 |
| EP | 0782304 | 7/1997 |
| EP | 0782315 | 7/1997 |
| EP | 0782316 | 7/1997 |
| EP | 0813162 | 12/1997 |
| EP | 0825752 | 2/1998 |
| EP | 0841796 | 5/1998 |
| EP | 0843453 | 5/1998 |
| EP | 0886228 | 12/1998 |
| WO | WO 9708901 | 3/1997 |

OTHER PUBLICATIONS

M. Day et al.; A Model for Presence and Instant Messaging; Feb. 2000; pp. 1-17.

Anderl; "An Enhanced Message Newtworking Topology; Multimedia Messaging with the Intuity (TM) Interchange Server", Bell Labs Technical Journal, Apr.-Jun. 1998, pp. 124-135.

"Die T-Net-Box-der Anrufbeantworter im Netz", XP-000861610, 1998, 8 pages.

"General Recommendations on Telephone Switching and Signalling- Introduction to Intelligent Network Capability Set 1", International Telecommunication Union, XP- 002141945, Mar. 1993, 28 pages.

"The Belcore and ITU—T Call Model Operations", XP-002141946, 1998, 24 pages.

Transactions in Intelligent Networks;, XP-002141947, 1998, 92 pages.

Bosco; "Voice Services on the Intelligent Network: Intelligent Peripherals and Service Nodes", XP- 000607359, Aug. 1992, 4 pages.

Day; "A Model for Presence and Instant Messaging", Feb. 2000, 17 pages.

Day; "Instant Messaging/ Presence Protocol Requirements", Feb. 2000, pp. 1-26.

Gao; U.S. Appl. No. 11/938,522, filed Nov. 12, 2007 (Note: Copy not provided as it is part of PTO records).

Jordan; U.S. Appl. No. 11/610,769, filed Dec. 14, 2006 (Note: Copy not provided as it is part of PTO records).

Bedingfield; U.S. Appl. No. 09/513,005, filed Feb. 20, 2000 (Note: Copy not provided as it is part of PTO records).

Adamczyk; U.S. Appl. No. 09/624,897, filed Jul. 25, 2000 (Note: Copy not provided as it is part ot PTO records).

Bedingfield; U.S. Appl. No. 10/369,445, filed Feb. 19, 2003 (Note: Copy not provided as it is part of PTO records).

Gao; U.S. Appl. No. 10/232,749, filed Sep. 3, 2002 (Note: Copy not provided as it is part of PTO records).

Jordan; U.S. Appl. No. 60/343,305, filed Dec. 18, 2001 (Note: Copy not provided as it is part of PTO records).

Gao; U.S. Appl. No. 10/759,165, filed Jan. 20, 2004 (Note: Copy not provided as it is part of PTO records).

Adamczyk; U.S. Appl. No. 10/355,931, filed Jan. 31, 2003 (Note: Copy not provided as it is part of PTO records).

Jordan; U.S. Appl. No. 10/097,278, filed Mar. 14, 2002 (Note: Copy not provided as it is part of PTO records).

Arnoff; U.S. Appl. No. 10/839,535, filed May 5, 2004 (Note: Copy not provided as it is part of PTO records).

Bedingfield; Non- Final Rejection mailed Apr. 1, 2003; U.S. Appl. No. 09/513,005, filed Feb. 20,2000 (Note: Copy not provided as it is part of PTO records).

Bedingfield; Final Rejection mailed Jan. 28, 2004; U.S. Appl. No. 09/513,005, filed Feb. 20, 2000 (Note: Copy not provided as it is part of PTO records).

Bedingfield; Non-Final Rejection mailed Jul. 1, 2004; U.S. Appl. No. 09/513,005, filed Feb. 20,2000 (Note: Copy not provided as it is part of PTO records).

Bedingfield; Notice of Allowance and Fees Due mailed Aug. 25, 2004; U.S. Appl. No. 09/513,005, filed Feb. 20, 2000 (Note: Copy not provided as it is part of PTO records).

Bedingfield; Non- Final Rejection mailed Feb. 10, 2006; U.S. Appl. No. 10/369,445, filed Feb. 19, 2003 (Note: Copy not provided as it is part of PTO records).

Bedingfield; Final Rejection mailed Jul. 24, 2006; U.S. Appl. No. 10/369,445, filed Feb. 19, 2003 (Note: Copy not provided as it is part of PTO records).

Bedingfield; Notice of Allowance and Fees Due mailed Jun. 1, 2007; U.S. Appl. No. 10/369,445, filed Feb. 19, 2003 (Note: Copy not provided as it is part of PTO records).

Bedingfield; Notice of Allowance and Fees Due mailed Nov. 23, 2007; U.S. Appl. No. 10/369,445, filed Feb. 19, 2003 (Note: Copy not provided as it is part of PTO records).

Adamczyk; Non- Final Rejection mailed Apr. 22, 2005; U.S. Appl. No. 10/355,931, filed Jan. 31, 2003 (Note: Copy not provided as it is part of PTO records).

Adamczyk; Examiner Interview Summary Record mailed Jun. 7, 2005; U.S. Appl. No. 10/355,931, filed Jan. 31, 2003 (Note: Copy not provided as it is part of PTO records).

Adamczyk; Final Rejection mailed Nov. 22, 2005; U.S. Appl. No. 10/355,931, filed Jan. 31, 2003 (Note: Copy not provided as it is part of PTO records).

Adamczyk; Non- Final Rejection mailed Aug. 10, 2006; U.S. Appl. No. 10/355,931, filed Jan. 31, 2003 (Note: Copy not provided as it is part of PTO records).

Adamczyk: Notice of Allowance and Fees Due mailed Feb. 7, 2007; U.S. Appl. No. 10/355,931, filed Jan. 31, 2003 (Note: Copy not provided as it is part of PTO records).

Adamczyk; Notice of Allowance and Fees Due mailed Jul. 11, 2007; U.S. Appl. No. 10/355,931, filed Jan. 31, 2003 (Note: Copy not provided as it is part of PTO records).

Jordan; Non- Final Rejection mailed Jan. 14, 2005; U.S. Appl. No. 10/097,278, filed Mar. 14, 2002 (Note: Copy not provided as it is part of PTO records).

Jordan; Examiner Interview Summary Record mailed Mar. 14, 2005; U.S. Appl. No. 10/097,278, filed Mar. 14, 2002 (Note: Copy not provided as it is part of PTO records).

Jordan; Final Rejection mailed Jul. 14, 2005; U.S. Appl. No. 10/097,278, filed Mar. 14, 2002 (Note: Copy not provided as it is part of PTO records).

Jordan; Examiner Interview Summary Record mailed Oct. 7, 2005; U.S. Appl. No. 10/097,278, filed Mar. 14, 2002 (Note: Copy not provided as it is part of PTO records).

Jordan; Non- Final Rejection mailed Dec. 5, 2005; U.S. Appl. No. 10/097,278, filed Mar. 14, 2002 (Note: Copy not provided as it is part of PTO records).

Jordan; Examiner Interview Summary Record mailed Jan. 4, 2006; U.S. Appl. No. 10/097,278, filed Mar. 14, 2002 (Note: Copy not provided as it is part of PTO records).

Jordan; Final Rejection mailed May 18, 2006; U.S. Appl. No. 10/097,278, filed Mar. 14, 2002 (Note: Copy not provided as it is part of PTO records).

Jordan; Notice of Allowance and Fees Due mailed Aug. 22, 2006; U.S. Appl. No. 10/097,278, filed Mar. 14, 2002 (Note: Copy not provided as it is part of PTO records).

Arnoff; Non- Final Rejection mailed Mar. 24, 2006; U.S. Appl. No. 10/839,535, filed May 5, 2004 (Note: Copy not provided as it is part of PTO records).

Arnoff; Final Rejection mailed Apr. 23,2007; U.S. Appl. No. 10/839,535, filed May 5, 2004 (Note: Copy not provided as it is part of PTO records).

Arnoff; Non- Final Rejection mailed Oct. 31, 2007; U.S. Appl. No. 10/839,535, filed May 5, 2004 (Note: Copy not provided as it is part of PTO records).

* cited by examiner

VOICE MAILBOX WITH MANAGEMENT SUPPORT

CROSS-REFERENCE TO RELATED APPLICATION

This application is a divisional of U.S. application Ser. No. 10/097,278, filed Mar. 14, 2002 now abandoned, which is entirely incorporated herein by reference and which claims the benefit of U.S. Provisional Application No. 60/343,305, filed Dec. 18, 2001, which is entirely incorporated by reference.

TECHNICAL FIELD

The present invention relates generally to a wireless communications system and, more particularly, to a wireless communications system having a voice mailbox system with management support.

BACKGROUND OF THE DISCLOSURE

Telecommunications services are an integral part of business and personal communications, allowing geographically remote users to communicate irrespective of location. Communications messages between users may assume a variety of formats. For instance, users may communicate by various methods including telephone calls, e-mail messages, instant messages, pages, and voicemail messages.

Most communications systems feature a notification mechanism for alerting a user of an incoming message. In general, such notifications make it possible for users to realize the exact moment when an incoming communication is received. One common notification is the audible ring of a telephone to signal an incoming call. Another common notification is a representative icon, such as a picture of an unopened envelope, displayed on a graphical user interface (GUI) to indicate that an e-mail message has been received.

At certain times and places, however, it may be inconvenient for a user to receive a notification or receive a message in a particular format. In a business meeting, for example, it may be distracting for a user to hear the audible ring of a telephone or receive a telephone call. To avoid being disturbed, a user may turn off the ringer on the telephone and, in effect, disable communication. During such times, an important channel of communication is severed.

Accordingly, users would benefit from a communications system that enables received messages to be directed to an alternate location and/or to be rendered in an alternative format.

SUMMARY OF THE DISCLOSURE

In one general aspect, telecommunications services are provided by receiving a notification forwarded from a wireless device, the notification indicating that a voicemail message intended for a recipient associated with the wireless device was received. The voicemail message associated with the notifications is retrieved and forwarded to an alternate device associated with the recipient and/or converted into a text message representative of the content of the voicemail message.

Implementations may include one or more of the following features. For example the wireless device may include an interactive page, a personal digital assistant, and/or a mobile telephone. The notification may include a message identifier, the time of receipt, a sender attribute (e.g., a telephone number), and a duration of the voicemail message. The alternate device may include a mobile telephone and/or a landline telephone. The voicemail message may be converted into a text message by a human operator and/or by voice recognition software.

Implementations may include receiving a voicemail message intended for the recipient, storing the voicemail message, associating a message identifier with the stored voicemail message, sending a notification to a wireless device associated with the recipient, and/or receiving processing instructions from the recipient with the forwarded notification.

Forwarding the voicemail message may include sending the voicemail message across an intermediate network, such as the Internet, the World Wide Web, and/or a telephone network. A wireless network including a voicemail system, a gateway system, and/or an operator system may receive the forwarded notification.

Aspects of the present invention may be implemented by an apparatus and/or by a computer program stored on a computer readable medium. The computer readable medium may comprise a disk, a client device, a network device, and/or a propagated signal.

Other features and advantages will be apparent from the following description, including the drawings, and from the claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE PREFERRED EMBODIMENT

According to aspects of the present invention, telecommunications services are provided by receiving a notification forwarded from a wireless device, the notification indicating that a voicemail message intended for a recipient associated with the wireless device was received. The voicemail message associated with the notifications is retrieved and forwarded to an alternate device associated with the recipient and/or converted into a text message representative of the content of the voicemail message.

Figure 1:
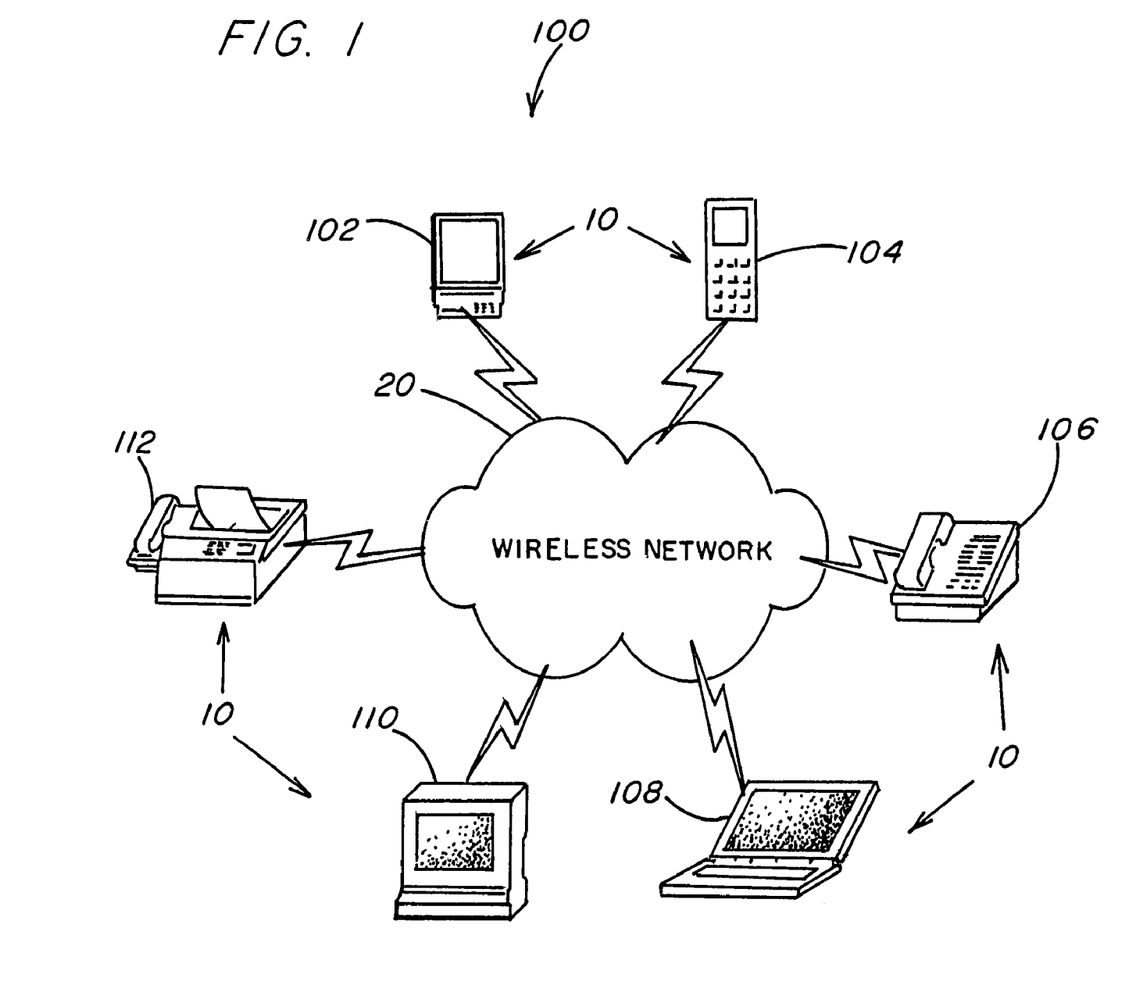
FIG. 1 is a block diagram illustrating aspects of a wireless communications system.

FIG. 1 illustrates an exemplary wireless computer system 100. For brevity, several elements in the figure are represented as monolithic entities. The wireless computer system 100 may use, for example, Mobitex® technology of the Cingular Interactive Intelligent Wireless Network service provided by Cingular Wireless. Aspects of the Mobitex® network may include a two-way wireless data service capable of connecting to other complimentary networks. A wireless data service such as the Mobitex® network includes a hierarchy of communications systems that can provide nationwide wireless service through a network of base stations and local switches under the control of higher order regional switches or exchanges.

As shown, the wireless communications system 100 includes several clients 10 interconnected through a wireless network 20. In one implementation, the clients 10 include a first wireless device 102, such as an Internet-enabled personal digital assistant (PDA), an Internet-enabled mobile telephone, an interactive pager such as one provided by Research in Motion (RIM) Inc., or any other type of device having a digital processor capable of accessing the wireless network 20. In this implementation, the clients 10 also include a second wireless device 104, a telephone 106, a personal computer (PC) 108, a workstation 110, and a facsimile (fax) machine 112.

In general, the clients 10 include hardware and/or software components for communicating with the wireless network 20 through wired and/or wireless communication pathways. The clients 10 may be structured and arranged to communicate using various communication protocols (e.g., HTTP, WAP) and encapsulation protocols (e.g., UDP) to establish connections (e.g., peer-to-peer) between network elements and/or to operate within or in concert with one or more other systems (e.g., the Internet and/or Web).

The clients 10 may include one or more software applications and/or computer programs for commanding and directing communications. The software applications and/or computer programs may be embodied permanently or temporarily in any type of machine, component, physical or virtual equipment, storage medium, or propagated signal capable of providing instructions to the wireless device. In particular, the software applications and/or computer programs may be stored on a storage media or device (e.g., EEPROM, magnetic diskette, or propagated signal) readable by a computer system, such that if the storage media or device is read by the computer system, the functions described herein are performed.

The wireless network 20 is configured to enable communication between and among the clients 10. For example, the wireless network 20 may enable the first wireless device 102 to send and/or receive messages from the second wireless device 104, the telephone 106, and/or any other client 10 irrespective of physical separation. The wireless network 20 may directly or indirectly connect the clients 10 and may include and/or form part of an information delivery network such as, for example, an analog or digital wireless telecommunications network, the Internet, and/or the World Wide Web (Web). The information delivery network may include a local area network (LAN), a wide area network (WAN), a telephone network (e.g., analog, digital, wired, wireless, PSTN, ISDN, or xDSL), a radio network, a television network, a cable network, a satellite network, and/or any other communications network configured to carry data. Each network may include one or more elements such as, for example, intermediate nodes, proxy servers, routers, switches, adapters, and wired or wireless data pathways, configured to direct and/or deliver data.

The wireless network 20 may support a variety of telecommunications and/or data services including Internet and/or Web access and interactive messaging. Interactive messaging provides, for example, a way of communicating with the ability of sending, receiving, and forwarding text messages, voice messages, e-mail messages, and/or facsimile messages. In particular, mobile-to-mobile text messaging allows a sender to create and transmit text messages using the mobile number of a recipient. E-mail messaging allows a sender to address e-mail messages using the mobile number of a recipient. Web messaging allows users to send personalized text messages from a public Web site. Users may subscribe to information services and receive alerts concerning news, stock quotes, sports scores, entertainment, or other information displayed on a digital mobile phone. Users may send and receive numeric and/or alphanumeric pages; send and retrieve voicemail messages; and send, receive, forward, and/or print out faxes using a digital phone and a fax machine. IVR services process remote touch-tone entries from users to query a database and obtain computerized voice responses. Text-to-speech services allow users having only telephone access to have a text messages converted into audio format.

In one implementation, the wireless network 20 supports a telecommunications service that enables users to direct a received message to an alternate location and/or render a received message in an alternative format. In particular, the wireless network supports a telecommunications service that enables users to direct a received voicemail message to a local telephone and/or render a received voicemail message as a text message.

Figure 2:
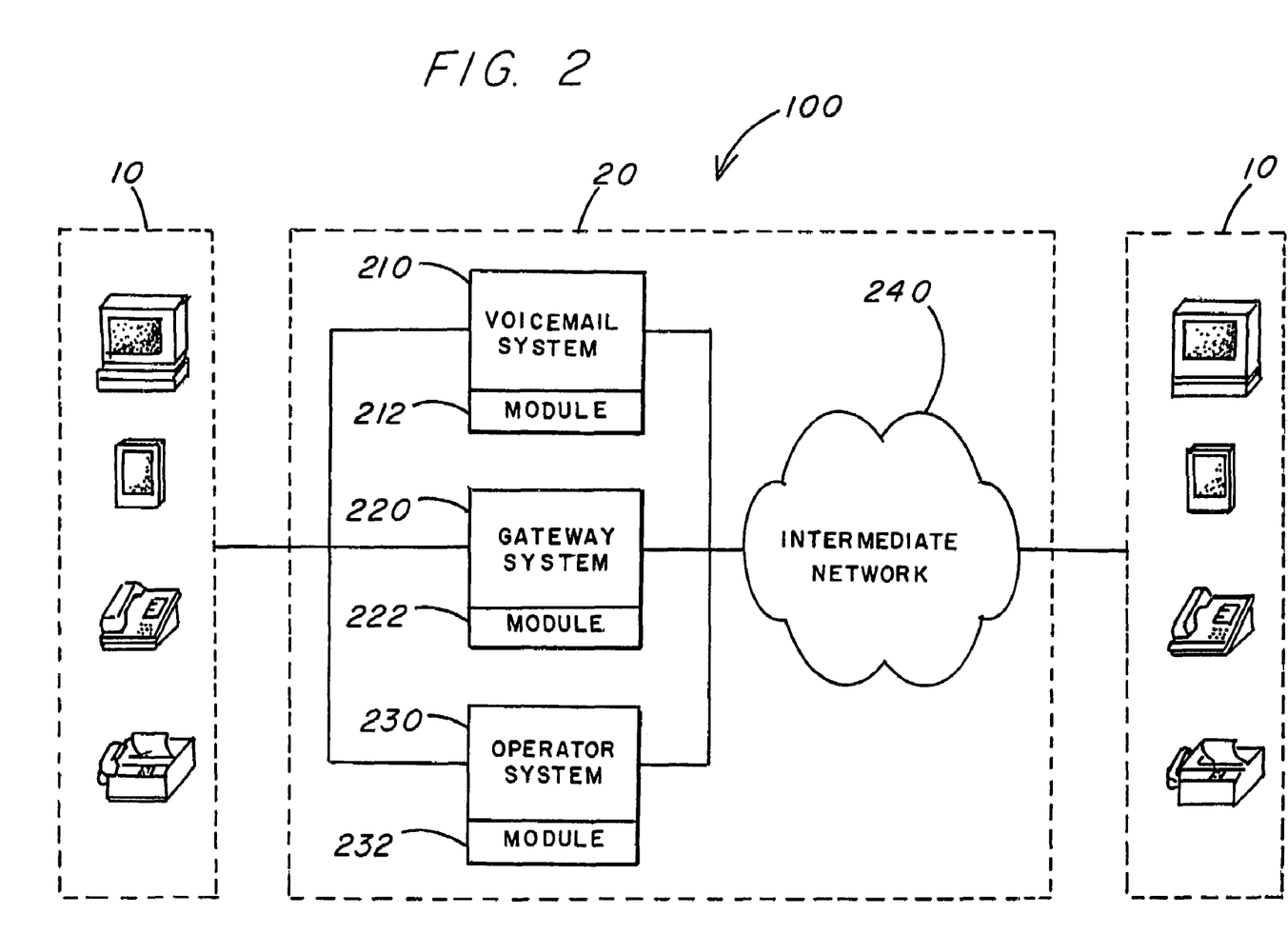
FIGS. 2 and 3 are block diagram expansions of aspects of FIG. 1.

Referring to FIG. 2, a block diagram expansion of FIG. 1 focuses primarily on one implementation of the wireless network 20. In this implementation, the wireless communications system 100 includes a wireless network 20 having a voicemail system 210, a gateway system 220, and an operator system 230 that are in communication with each other and an intermediate network 240.

The voicemail system 210 may be configured to record and store voicemail messages in an audio format (e.g., vox or .wav format). In one implementation, the voicemail system 210 may generate a voicemail message by recording a spoken message from a telephone user, for example. The voicemail system 210 also may be configured to determine and store attributes of the recorded voicemail message, such as a name and/or a number associated with the sender of the voicemail message, as well as the duration (e.g., in minutes) of the voicemail message. The voicemail system 210 may associate a message identifier with each generated voicemail message. The message identifier may include, for example, a unique pointer indicating the storage location of the voicemail message within the voicemail system 210. For instance, the voicemail system 210 may include a database structure including a system of folders corresponding to subscribers of the voicemail system 210, and the message identifier may be used to point to a particular file maintained in a particular folder corresponding to a particular subscriber.

The gateway system 220 may be configured to detect received voicemail messages within the voicemail system 210 and transmit notifications indicating the receipt of a voicemail message. For example, the gateway system 220 may detect a received voicemail message stored in the voicemail system 210 and generate a notification for the recipient of the voicemail message. The gateway system 220 may detect a voicemail message, for example, by determining whether a folder associated with a particular subscriber contains an audio file (e.g., .vox file or .wav file). If an audio file is present, the gateway system 220 may send a notification to a client 10 associated with the recipient of the voicemail message. To conserve valuable bandwidth, the actual audio file may not be included in the notification. Rather, the notification may contain information about the voicemail message such as the time of receipt, sender attributes (e.g., name, number), and the duration of the voicemail message. The notification also may include a message identifier that maybe used to retrieve and listen to a voicemail message, i.e., an audio file, maintained on the voicemail system 210.

The gateway system 220 may be configured to forward a received message (e.g., a voicemail message) to an alternate client 10 associated with the recipient. In one implementation, the gateway system 220 forwards a voicemail message in response to an instruction from a client 10 (e.g., first wireless device 102) associated with the recipient of the voicemail message. For example, after delivering the notification, the gateway system 220 may receive an instruction from the first wireless device 102 to forward the voicemail message to an alternate device (e.g., telephone 106). The instruction to forward may contain a command to contact the alternate device and render the voicemail message. Upon receiving the instruction to forward, the gateway system 220 may retrieve the audio file from the voicemail system 210, contact the alternate device, and render the audio file on the alternate device. For instance, a user may receive a notification on a wireless pager that a voicemail message has been received and send an instruction to forward the voicemail message to a particular telephone number, such as the telephone number of a readily-accessible telephone. After the instruction is sent, the telephone will ring. When the user answers the telephone, the voicemail is played.

The gateway system 220 also may be configured to forward a notification to the operator system 230. In one implementation, the gateway system 220 forwards a notification in response to an instruction from a client 10 associated with the recipient of the voicemail message. For example, after delivering the notification to the client 10 of the recipient, the gateway system 220 may receive an instruction from the client 10 to forward the voicemail message. The instruction to forward may contain an implicit or explicit command to render the voicemail message in an alternate format, such as text. Upon receiving the instruction to forward, the gateway system 220 sends the notification to the operator system 230. In some implementations, the gateway system 220 may retrieve the audio file from the voicemail system 210 and send the audio file along with the notification to the operator system 230.

The operator system 230 may be configured to convert messages into one or more alternate formats. In one implementation, the operator system 230 receives a forwarded notification from the gateway system 220 and/or from a client 10. Upon receiving the notification, the operator system 230 may retrieve a particular message (e.g., voicemail message) associated with the notification. For example, the operator system 230 may extract a message identifier from the notification and use the message identifier to locate a stored voicemail message. As described above, the message identifier may include a pointer to the exact storage location (e.g., voice mailbox) containing the voicemail message. The operator system 230 may be granted privileged administrative rights to access the voice mailbox of a subscriber and retrieve a particular voicemail message, i.e., an audio file, associated with a provided message identifier. Alternatively, the operator system 230 may receive the voicemail message from the gateway 220.

After retrieving the message associated with the notification, the operator system 230 may convert the message into an alternate format. In one implementation, the operator system 230 converts an audio voicemail message into a text message. The operator system 230 may generate a converted message by playing the recorded voicemail message and creating a written transcript. For example, a human operator may be utilized by the operator system 230 to listen to voicemail messages and transcribe the voicemail messages into text. Alternatively, a software application, such as a voice recognition program, may be used to automatically convert a voicemail message into text.

The operator system 230 also may be configured to deliver converted messages. In one implementation, the operator system 230 delivers a text message converted from a voicemail message. The operator system 230 may deliver the converted message (e.g., text message) to the client 10 associated with the recipient of the voicemail message. Alternatively, the operator system 230 may deliver the converted message to the gateway system 220 for subsequent delivery to a client 10 associated with the recipient.

In one implementation, the voicemail system 210, the gateway system 220, and the operator system 230 each include one or more devices operating under the direction of associated control modules, i.e., a voicemail system control module 212, a gateway system control module 222, and an operator system control module 232. One example of a device is a general-purpose computer capable of responding to and executing instructions. Other examples include a special-purpose computer, a PC, a workstation, a server, a laptop, or any other component, machine, tool, equipment, or some combination thereof capable of responding to and executing instructions.

One example of a control module is a software application (e.g., operating system, browser application, micro-browser application, server application, proxy application, gateway application, tunneling application, ISP application, and/or other communication application) loaded on one or more devices that commands and directs the communications enabled by the device. Other examples include a computer program, a piece of code, an instruction, another device, or some combination thereof. The control module may be implemented as software code utilizing any suitable computer language (e.g., Java, Perl, C or C++) using object-oriented techniques, for example. The control module also may be a computer, such as a workstation or PC, a microprocessor, a network server, a Java virtual machine, or an application specific integrated circuit, using any suitable type of computer instructions.

The control module (e.g., voicemail system control module 212, gateway system control module 222, and/or operator system control module 232) maybe embodied permanently or temporarily in any type of machine, component, physical or virtual equipment, storage medium, or propagated signal capable of providing instructions to a device. In particular, the control module (e.g., software application, computer program) may be stored on a storage media or device (e.g., ROM, magnetic diskette, or propagated signal) readable by a general or special purpose computer system, such that if the storage media or device is read by the computer system, the functions described herein are performed.

In one implementation, the voicemail system 210, the gateway system 220, and the operator system 230 communicate with an intermediate network 240. In general, the intermediate network 240 functions as a delivery system for carrying and routing messages among clients 10 and/or elements of the wireless network 20. For example, the intermediate network 240 may include an analog or digital wireless telecommunications network (e.g., PSTN) for carrying messages to one or more clients 10 from the gateway 210 and/or for carrying messages from one or more clients 10 to the voicemail system 220. The intermediate network 240 also may include one or more LANs and/or WANs for interconnecting the voicemail system 210, the gateway system 220, and/or the operator system 230. Additionally, the intermediate network 240 may include or make up part of the Internet and/or Web.

Figure 3:
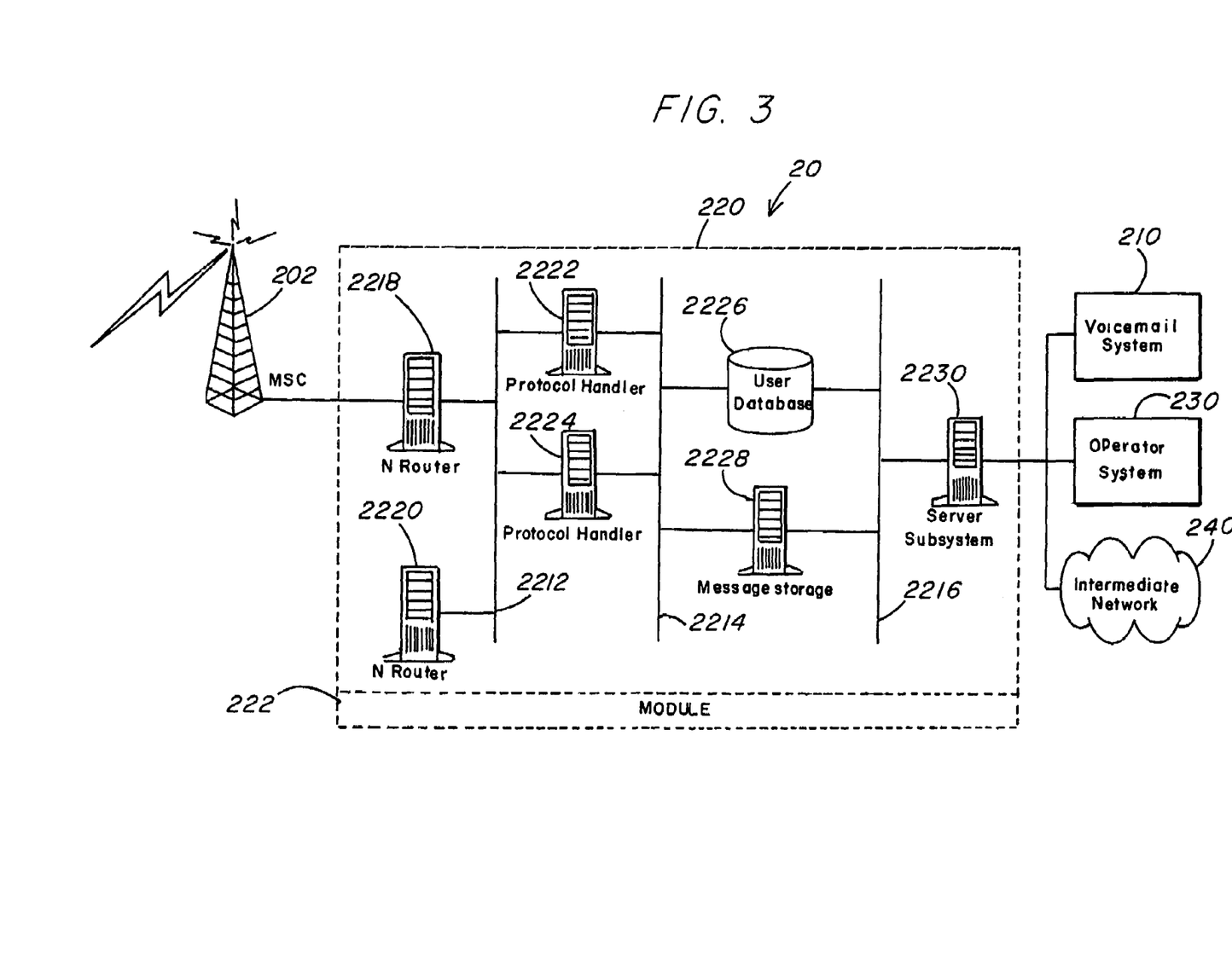

Referring to FIG. 3, a block diagram expansion of FIGS. 1 and 2 focuses primarily on one implementation of the wireless network 20 and, in particular, on aspects of the gateway 210. It is to be understood that while the following description of FIG. 3 uses the gateway 210 to illustrate certain aspects of the present invention, the description may be applicable as well to other elements of the communications system 100 (e.g., voicemail system 210, the operator system 230, and/or the intermediate network 240).

In this implementation, the wireless communications system 100 includes a wireless network 20 having a gateway system 220. The gateway system 220 may operate under the direction of a gateway system control module 222 (e.g., software code) installed on one or more devices of the gateway system 220. As shown in FIG. 3, the wireless network 20 includes a gateway system 220 in communication with a MSC 202, a voicemail system 210, an operator system 230, and an intermediate network 240.

The gateway system 220 may be configured from a standard Santa Cruz Operation (SCO) UNIX system running an Internet-accessible operating system such as Windows NT by Microsoft. The system may use TCP/IP and UDP for communications and hypertext markup language (HTML) to support Internet web browsers, including those provided by Netscape and Microsoft. The computer language used by the gateway system 220 may be, for example, in the C programming language, Java or HTML.

In general, the gateway system 220 may be configured to transfer messages within the wireless network 20 and among interconnected networks (e.g., intermediate network 240). In some implementations, the gateway system 220 may perform protocol conversions that are necessary to enable communications through the intermediate network 240. For example, the gateway system 220 may carry out protocol conversion between a mobile communications protocol (e.g., WAP) employed by a wireless device and an Internet communication protocol (e.g., HTTP, TCP/IP) employed by the intermediate network 240. Such protocol conversion may involve routing messages through a network gateway processor that transforms messages from a foreign protocol to a native protocol.

The gateway system 220 also may perform content encoding, such as the encoding of wireless markup language (WML) into binary format, and compilation of WML-Scripts. Additionally, the gateway system 220 may manage the flow of data and the volume of communications traffic over the wireless network 20, by limiting the bandwidth size of data packets, for example, in order to preserve the integrity of the wireless network 20.

The wireless network 20 includes a mobile switching center (MSC) 202 for connecting to one or more wireless devices (e.g., first wireless device 102, second wireless device 104). Although only one MSC is illustrated in FIG. 3, it is to be understood that the wireless network 20 may include a larger number of MSCs. In general, the MSC 202 functions as an interface between wireless devices and the wireless network 20. The MSC 202 may include transmitters, receivers, and switching devices for providing either digital or analog cellular telephone service and for performing switching functions to permit communication between wireless devices. The MSC 202 also may perform various communications functions such as user identification, subscription verification, location detection, mobile tracking, call processing, call routing, and/or other signaling functions necessary to control calls to and from other telecommunications and data systems.

The gateway system 220 operates under the direction of a control module 222. The broken lines are intended to indicate that in some implementations, the control module 222, or portions thereof considered collectively, may instruct one or more elements of the gateway system 220 to operate as described.

In one implementation, the gateway system 220 includes one or more internal networks 2212, 2214, and 2216, such as local area networks (LANs), configured to interconnect various elements of the gateway system 220. For example, the internal networks 2212, 2214, and 2216 may interconnect components including Nrouters 2218 and 2220, protocol handlers 2222 and 2224, a user database 2226, a message storage server 2228, and a server subsystem 2230.

At the gateway system 220, the Nrouters 2218 and 2220 communicate with one or more MSCs 202 including regional switches residing at remote locations. The communication between the regional MSC 202 and the Nrouters 2218, 2220 may use, for example, an X.25 protocol. Generally, the Nrouters 2218 and 2220 are configured to route and deliver messages received at the MSC 202 to various elements within the wireless network 20. Each of the Nrouters 2218 and 2220 may include one or more dual-ported connectivity cards, for example, those provided by Eicon Networks, so that each Nrouter may support multiple Fast-Sequenced Transport (FST) connections. In one implementation, the gateway system 220 can handle up to 255 Nrouters.

The Nrouters 2218 and 2220 may communicate with protocol handlers 2222, 2224 over an internal network 2212 using, for example, X-sockets. In general, the protocol handlers 2222 and 2224 are configured to provide support for any customized protocols (e.g., application-specific protocols) necessary to access customized objects. For example, if a particular object is supported by a protocol other than a standard communication protocol (e.g., HTTP, TCP/IP), the protocol handlers 2222 and 2224 may use a specified application protocol to retrieve and access the particular object. In one implementation, the protocols handled by protocol handlers 2222, 2224 may specify that message storage and internal e-mail access may be handled by the UNIX standard Network File System (NFS) distributed file system from SUNSOFT, which allows data to be shared across the network regardless of the protocol. Each protocol handler 2222 and 2224 also may maintain a database cache (not shown) configured to maintain recently accessed data in order to increase the speed of internal network communications and to limit database access requests over the internal networks 2212, 2214 and 2216.

Additionally, the protocol handlers 2222, 2224 may process information contained in user database machines, such as user database 2226. The protocol handlers 2222, 2224 may use data from the user database 2226 to communicate with other systems or networks external to the gateway system 220. Generally, the user database 2226 contains an interface to content addressable memory (CAM) (not shown) for updating information, e.g., user account information and status. Each user associated with the wireless communications system 100 may have an account maintained in the user database 2226 including a unique identifier, such as a MOBITEX® access number, for example. Information maintained in the user database 2226 may be used to validate users, monitor usage, and maintain billing information.

The gateway system 220 also may include a message storage server 2228 configured to store and forward messages (e.g., e-mail, voicemail, fax, data) intended for one or more recipients. The intended recipient may be a user of the wireless network 20 that has subscribed to receive one or more interactive messaging features. The message storage server 2228 may include a system of folders configured to store interactive messaging content associated with subscribers. Interactive messaging provides, for example, a way of communicating with the ability of sending, receiving, and forwarding text messages, voice message, e-mail messages, and/or facsimile messages. The message storage server 2228 may store various content associated with interactive messaging and allow users to retrieve and manage such content.

The message storage server 2228 also may contain various routing and delivery program modules configured to deliver messages to a recipient or to an intermediate component for subsequent delivery to a recipient. One or more backup databases or servers may be used in the gateway system 220, each backup database being synched automatically by sockets communications.

As shown in FIG. 3, the wireless network 20 and, in particular, the gateway system 220 includes a server subsystem 2230. Generally, the server subsystem 2230 is configured to provide interactive communications services such as, for example, messaging services, information services, paging services, voicemail services, facsimile services, interactive voice response (IVR) services, and text-to-speech services. In one implementation the server subsystem 2230 may be configured to detect a received message (e.g., voicemail message) and send a notification to a wireless device associated with the recipient of the received message. The server subsystem 2230 also may be configured to receive instructions and/or a forwarded notification and route the instructions and/or forwarded notification to an operator system 230. The server subsystem 2230 further may be configured to forward a received message to an alternate client device and/or forward a received message for rendering in an alternate format.

In some implementations, the functions described above with respect to the voicemail system 210 and/or the operator system 230 may be performed by the gateway system 220 and, in particular, the server subsystem 2230. For example, in some implementations, the voicemail system 210 and/or the operator system 230 may be included within and/or form part of the server subsystem 2230.

Figure 4:
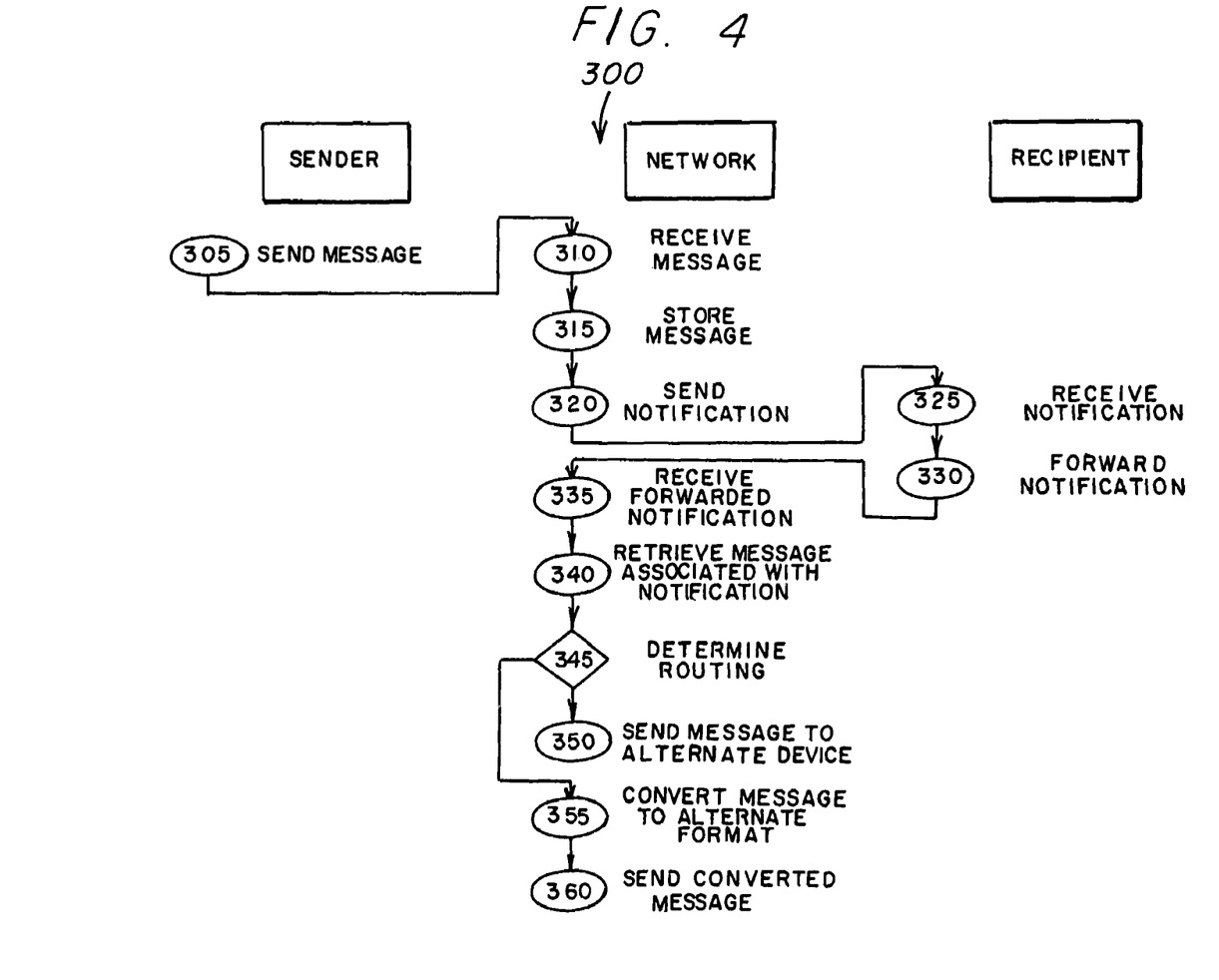
FIG. 4 is a flow chart of communications methods that may be implemented by the wireless communications system illustrated in FIGS. 1-3.

Referring to FIG. 4, a sender, a recipient, and a network interact according to a procedure 300 for enabling received messages to be directed to an alternate location and/or rendered in an alternative format. In general, the sender and/or the recipient may have attributes comparable to aspects of a client 10 and the network may have attributes comparable to aspects of a wireless network 20.

The procedure 300 begins when a message intended for a particular recipient is sent (step 305). The message may include, for example, a spoken message transmitted by the sender using a telephone. The network receives the message from the sender (step 310) and stores the message (step 315). in one implementation, the network stores the spoken message as a recorded voicemail message. The network may include or form part of system (e.g., voicemail system 210) configured to receive and store voicemail messages. Voicemail messages may be stored and maintained in a storage location, such as a database, in the network.

At some point after receiving a message (step 310), the network sends a notification to the recipient (step 320). The notification may include certain information about the received message such as, for example, the time of receipt, sender attributes, the size (e.g., duration) of the message, and a message identifier. The recipient receives the notification from the network (step 325). The recipient may display the notification on a wireless device such as an interactive pager, for example. The notification may be displayed as a graphical user interface capable of conveying information and soliciting user input.

In one implementation, the recipient forwards the notification (step 330) and the network receives the forwarded notification (step 335). The network may include one or more systems (e.g., gateway system 220, operator system 230) configured to receive and process the forwarded notifications. For example, the recipient may forward the notification to a gateway system 220 with instructions to route the received message to an alternate device. The instruction may include an identifier (e.g., telephone number, IP address) associated with the alternate device. Alternatively, the recipient may forward the notification to an operator system 230 with instructions to render the received message in an alternate format. The instruction may include a conversion command such as an instruction to convert a voicemail message to a text message.

The network may retrieve the message associated with the notification (step 340). In one implementation, the network may extract a message identifier from the notification and retrieve the message (e.g., voicemail message) from a storage location using the message identifier as a pointer. After retrieving the message (step 340), the network may determine the routing of the message (step 345). In general, routing the message involves delivery of the message to the appropriate system for processing as indicated by the recipient. For example, the network may include one or more dedicated systems (e.g., gateway system 220, operator system 230) designed to carry out the instructions specified by the recipient. The instructions from the recipient may include, for example, a command to forward the message to an alternate device and/or a command to render the received message in an alternate format.

In one implementation, the network may send the received message to an alternate device (step 350). In general, the network may send the received voicemail message to a device readily accessible by the recipient. For example, the recipient may receive notification of a voicemail message through a wireless pager and instruct the network to send the received voicemail message to a mobile or landline telephone. The telephone may ring, and the recipient may hear the voicemail message by answering the telephone.

In another implementation, the network may convert the received message into an alternate format (step 355) and send the converted message to the recipient (step 360). In general, the network may convert the received message into a format readily accessible by the recipient. For example, the recipient may receive notification of a voicemail message through a wireless pager and instruct the network to convert the voicemail message to text. The recipient may use the wireless pager to receive the converted message and render the message in text format.

Figure 5:
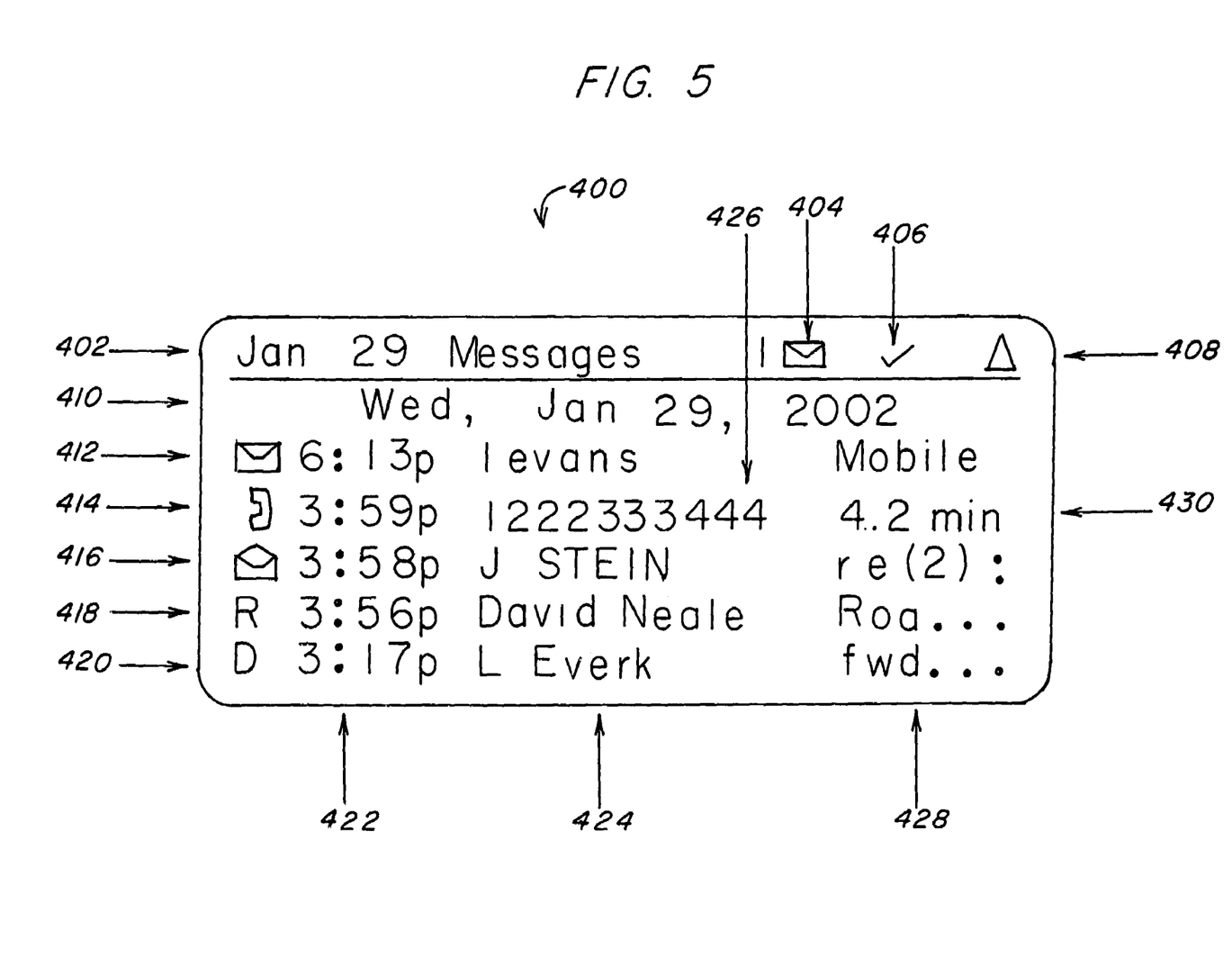
FIG. 5 is a graphical user interface that may be implemented by the wireless communications system illustrated in FIGS. 1-3.

Referring to FIG. 5, one implementation of a user interface (UI) 400 may be presented to users to convey information and solicit instructions. In one implementation, the UI 400 is used to forward a notification of a received voicemail to a network for processing. The voicemail message associated with the notification may be forwarded to an alternate device and/or converted to an alternate format.

As shown, the UI 400 displays a current date 402, the number of unread messages 404, a coverage icon 406 indicating that the user is located within a covered service area, and a navigational icon 408. The UI 400 further displays the date of receipt 410 of one or more messages, and several message status icons including an unopened icon 412 indicating that a text message has been received but had not been read, a voicemail icon 414 indicating that a voicemail message has been received, an opened icon 416 indicating that a text message has been received and opened, a read icon 418 indicating that a message sent to a recipient has been read by the recipient, and a delivered icon 420 indicating that a message sent to a recipient has been delivered to the recipient. Other icons (not shown) may indicate that a message has been sent, an error has occurred, the message has been saved, the message is important, and/or the message will be sent when coverage is reestablished.

The UI 400 also displays attributes of the received messages including the receipt time 422 and sender attributes 424. For received voicemail messages, the sender attributes 424 may include the telephone number 426 of the sender. A message description 428 also may be displayed—For received voicemail messages, the message description may include the duration 430 of the voicemail message.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

Therefore, having thus described the invention, at least the following is claimed:

1. A communications method, comprising:
   receiving by an operator system a notification forwarded from a wireless handheld device, the notification generated by a gateway indicating receipt of a voicemail message associated with a recipient at a voicemail system;
   retrieving by the operator system the voicemail message associated with the notification; and
   forwarding by the operator system the voicemail message to an alternate device associated with the recipient for storage and playback on the alternate device;
   wherein the operator system is distinct from the voicemail system, and wherein the wireless handheld device can retrieve the message from the voicemail system without using the operator system.

2. The communications method of claim 1, wherein the wireless handheld device comprises at least one of an interactive pager, a personal digital assistant, and a mobile telephone.

3. The communications method of claim 1, further comprising receiving a voicemail message intended for the recipient.

4. The communications method of claim 1, further comprising storing a voicemail message intended for the recipient.

5. The communications method of claim 1, further comprising associating a message identifier with a stored voicemail message.

6. The communications method of claim 1, further comprising sending a notification to the wireless handheld device associated with the recipient.

7. The communications method of claim 1, further comprising receiving processing instructions from the recipient with the forwarded notification.

8. The communications method of claim 1, wherein the notification comprises a message identifier.

9. The communications method of claim 1, wherein the notification comprises at least one of a time of receipt, a sender attribute, and a duration of the voicemail message.

10. The communications method of claim 9, wherein the sender attribute comprises a telephone number associated with the sender.

11. The communications method of claim 10, wherein the forwarded notification is received by a wireless network.

12. The communications method of claim 11, wherein the forwarded notification is received by at least one of a voicemail system, a gateway system, and an operator system.

13. The communications method of claim 1, wherein forwarding the voicemail message comprises sending the voicemail message across an intermediate network.

14. The communications method of claim 13, wherein intermediate network comprises at least one of the Internet, the World Wide Web, and a telephone network.

15. The communications method of claim 1, wherein the alternate device comprises at least one of a mobile telephone and a land line telephone.

16. A communications system comprising a network apparatus configured to:
   receive a notification forwarded from a wireless handheld device, the notification generated by a gateway indicating receipt of a voicemail message associated with a recipient a voicemail system;
   retrieve the voicemail message associated with the notification; and
   forward the voicemail message to an alternate device associated with the recipient for storage and playback on the alternate device;
   wherein the network apparatus is distinct from the voicemail system, and wherein the wireless handheld device can retrieve the voicemail message from the voicemail system without using the network apparatus.

17. A communications apparatus comprising:
   means for receiving a notification forwarded from a wireless handheld device, the notification generated by a gateway indicating receipt of a voicemail message associated with a recipient at a voicemail system;
   means for retrieving the voicemail message associated with the notification; and
   means for forwarding the voicemail message to an alternate device associated with the recipient for storage and playback on the alternate device;

wherein the communications apparatus is distinct from the voicemail system, and wherein the wireless handheld device can retrieve the voicemail message without using the communications apparatus.

18. A computer program stored on a computer-readable medium, the computer program comprising instructions to:

receive by an operator system a notification forwarded from a wireless handheld device, the notification indicating that a voicemail message intended for a recipient associated with the wireless handheld device was received from a voicemail system;

retrieve by an operator system the voicemail message associated with the notification; and forward by an operator system the voicemail message to an alternate device associated with the recipient for storage and playback on the alternate device, wherein the wireless handheld device can retrieve messages from the voice system without using the operator system.

* * * * *